United States Patent
Andoh (10) Patent No.: US 9,102,421 B2
(45) Date of Patent: Aug. 11, 2015

(54) ATTITUDE CONTROL DEVICE FOR SPACE STATION WITH SYSTEM PARAMETER UNCERTAINTIES AND ON-ORBIT DYNAMIC DISTURBANCES

(71) Applicant: Fukashi Andoh, Toyota (JP)

(72) Inventor: Fukashi Andoh, Toyota (JP)

(*) Notice: Subject to any disclaimer, the term of this patent is extended or adjusted under 35 U.S.C. 154(b) by 0 days.

(21) Appl. No.: 13/783,301

(22) Filed: Mar. 3, 2013

(65) Prior Publication Data

US 2014/0246543 A1    Sep. 4, 2014

(51) Int. Cl.
*B64G 1/26* (2006.01)

(52) U.S. Cl.
CPC .......................... *B64G 1/26* (2013.01)

(58) Field of Classification Search
CPC ............ B64G 1/24; B64G 1/26; B64G 1/242; G05D 1/0825
USPC ................... 244/158.8, 164, 169, 171; 701/13
See application file for complete search history.

(56) References Cited

U.S. PATENT DOCUMENTS 6,020,956 A * 2/2000 Herman et al. .......... 356/139.01

* cited by examiner

*Primary Examiner* — Philip J Bonzell
*Assistant Examiner* — Christopher Hutchens (57) ABSTRACT

An attitude control device for space station with system parameter uncertainties and on-orbit dynamic disturbances. A plurality of state sensors measure a plurality of states of the space station. An identification frequency selecting device selects an identification frequency. A moment of inertia identification operator calculation unit calculates a moment of inertia identification operator. A moment of inertia identification device calculates moment of inertia of the space station. A disturbance torque identification device calculates disturbance torque. A control torque calculation unit calculates a control signal. A plurality of thrusters generate a control torque based on the control signal.

1 Claim, 8 Drawing Sheets

ATTITUDE CONTROL DEVICE FOR SPACE STATION WITH SYSTEM PARAMETER UNCERTAINTIES AND ON-ORBIT DYNAMIC DISTURBANCES

BACKGROUND OF THE INVENTION

The present invention relates to an attitude control device for space station with system parameter uncertainties and on-orbit dynamic disturbances that controls attitude angle of a space station with the presence of system parameter uncertainties due to astronaut motion, manipulation of payloads and docking with other spacecraft, combined with on-orbit dynamic disturbances such as disturbance torque caused by solar wind.

U.S. Pat. No. 5,959,861 discloses an adaptive robust control device for trajectory tracking of a robot manipulator with system parameter uncertainties and random disturbances that generates a control input comprising adaptive linearlization input based on identified system parameters, and robustness improving input.

The prior art in U.S. Pat. No. 5,959,861, if applied to attitude control of a space station, presents a poor transient performance when the rate of change of system parameters is not sufficiently small. Transient performance can be improved by high-gain robust control, however high-gain control introduces issues associated with noise sensitivity, and tradeoff between noise sensitivity and tracking performance becomes necessary. The best tradeoff is, in general, difficult to achieve since the rate of change of system parameters depends on astronaut motion, payload motion and motion of other spacecraft while docking with the space station, all of which are intricate and unpredictable.

SUMMARY OF THE INVENTION

The present invention provides an attitude control device for space station with system parameter uncertainties and on-orbit dynamic disturbances.

The attitude control device includes:
  an identification frequency selecting device finding a plurality of frequencies of disturbance torque applying a frequency analysis method such as Fourier transform to the three attitude angles measured by a plurality of state sensors while speed proportional control of the space station is conducted, and selecting an identification frequency away from a plurality of frequencies dominant in the three attitude angles, that is used in identification of moment of inertia of the space station;
  a moment of inertia identification operator calculation unit calculating a moment of inertia identification operator, a three by three matrix with components that are functions of a second order time derivative of a frequency component of the three attitude angles at the identification frequency, and polynomials of a first order time derivative of a frequency component of the three attitude angles at the identification frequency;
  a moment of inertia identification device calculating the moment of inertia of the space station as a frequency component of control torque at the identification frequency pre-multiplied by an inverse of the moment of inertia identification operator from the moment of inertia identification operator calculation unit;
  a disturbance torque identification device calculating disturbance torque due to solar wind as a difference between the moment of inertia of the space station from the moment of inertia identification device pre-multiplied by a three by three matrix with components that are functions of a second order time derivative of the three attitude angles, and polynomials of a first order time derivative of the three attitude angles, and the control torque; and
  a control torque calculation unit calculating a control signal that causes a plurality of thrusters to generate the control torque stabilizing the space station as a linear combination of a three dimensional vector with components proportional to a time derivative of the three attitude angles, three dimensional vector with components proportional to a sinusoidal function oscillating at the identification frequency, a three dimensional vector nonlinear with respect to the time derivative of the three attitude angles, and the disturbance torque from the disturbance torque identification device.

This construction utilizing the moment of inertia identification operator makes possible fast and precise moment of inertia identification and disturbance torque identification regardless of the rate of change of system parameters, and frequency components of disturbance torque. With this construction, attitude angle of the space station is stabilized with low noise sensitivity and high tracking performance.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 1:
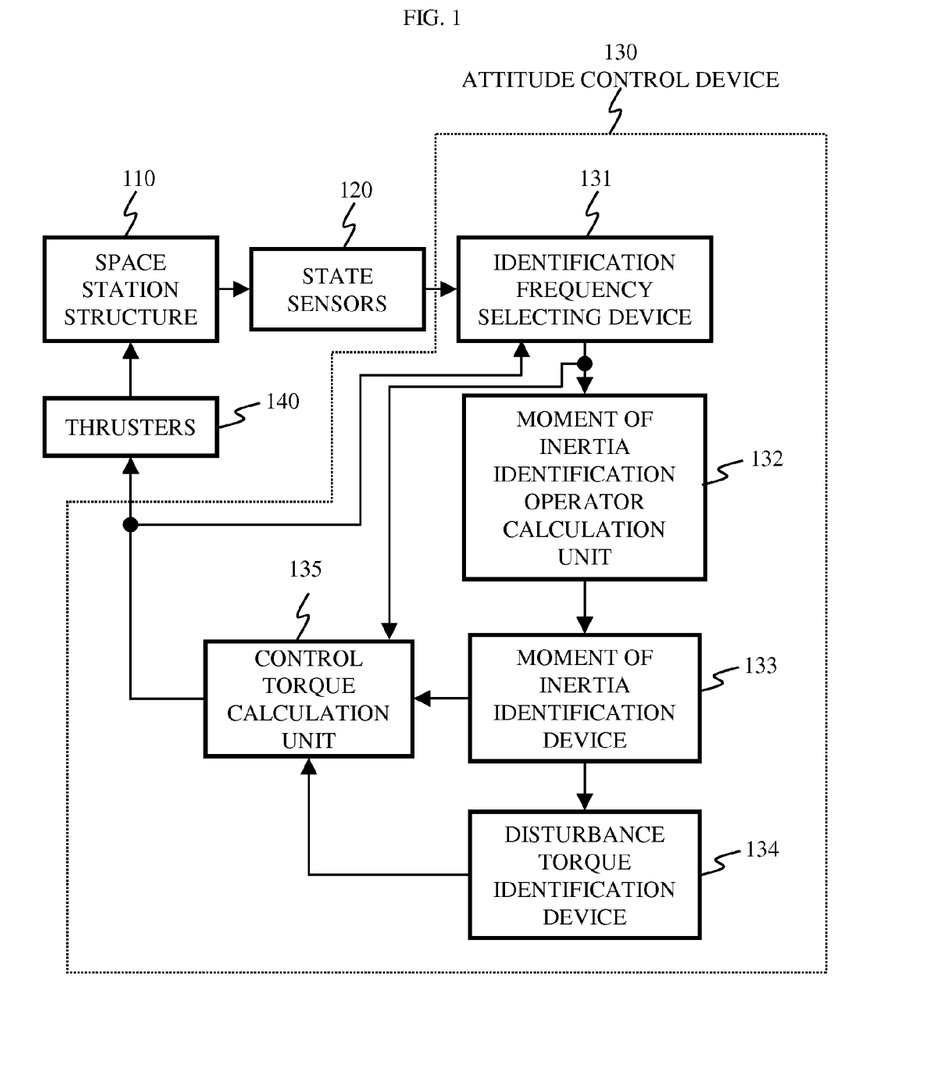
FIG. 1 is a block diagram of an attitude control device for space station in accordance with an exemplary embodiment of the invention.

FIG. 1 is a block diagram of an attitude control device for space station in accordance with an exemplary embodiment of the invention. The space station includes: a space station structure 110, a plurality of state sensors 120, an attitude control device 130 and a plurality of thrusters 140.

The space station structure 110 is a mechanical structure of a space station including a habitable area, a plurality of solar arrays, a plurality of propellant tanks, a plurality of propulsion systems, a plurality of docking ports that forms a basic shape of the space station, and mounts the plurality of state sensors 120, the attitude control device 130 and the plurality of thrusters 140.

The plurality of state sensors 120 measure a plurality of states of the space station such as three attitude angles about three principal axes and time derivatives thereof, and send them to the attitude control device 130 as a plurality of measured states.

The attitude control device 130 identifies time varying moment of inertia of the space station with moving astronauts and payloads, and a docking spacecraft, disturbance torque due to solar wind based on the plurality of states and sends a control signal to cause the plurality of thrusters 140 generate control torque stabilizing the three attitude angles of the space station structure 110. Detailed description of the attitude control device 130 is given together with its functional configuration in what follows.

The attitude control device 130 further includes: an identification frequency selecting device 131, a moment of inertia identification operator calculation unit 132, a moment of inertia identification device 133, a disturbance torque identification device 134 and a control torque calculation unit 135.

The identification frequency selecting device 131 finds a plurality of frequencies of disturbance torque using a frequency analysis method such as Fourier transform, and selects an identification frequency away from the plurality of frequencies of disturbance torque that is used in identification of the moment of inertia of the space station.

The moment of inertia identification operator calculation unit 132 calculates a moment of inertia identification operator, a matrix with components that are functions of a frequency component of the plurality of states at the identification frequency.

The moment of inertia identification device 133 calculates the moment of inertia of the space station using the moment of inertia identification operator from the moment of inertia identification operator calculation unit 132, and sends it to the disturbance torque identification device 134 and the control torque calculation unit 135.

The disturbance torque identification device 134 calculates disturbance torque due to solar wind using the moment of inertia of the space station from the moment of inertia identification device 133, and sends the disturbance torque to the control torque calculation unit 135.

The control torque calculation unit 135 calculates the control signal that causes the plurality of thrusters 140 to generate the control torque stabilizing the space station based on the moment of inertia from the moment of inertia identification device 133 and the disturbance torque from the disturbance torque identification device 134.

The plurality of thrusters 140 generate the control torque based on the control signal, and stabilize the three attitude angles.

Derived in what follows is a principle whereby the attitude control device 130 calculates control torque.

Equations of motion of the space station structure 110 are described as (1) through (3).

$$I_1 \ddot{\theta}_1 + (I_3 - I_2) \dot{\theta}_2 \dot{\theta}_3 = T_{c1} + T_{d1} \qquad (1)$$

$$I_2 \ddot{\theta}_2 + (I_1 - I_3) \dot{\theta}_3 \dot{\theta}_1 = T_{c2} + T_{d2} \qquad (2)$$

$$I_3 \ddot{\theta}_3 + (I_2 - I_1) \dot{\theta}_1 \dot{\theta}_2 = T_{c3} + T_{d3} \qquad (3)$$

where $I_1$ is a principal moment of inertia about a first principal axis (hereinafter referred to as "the first principal moment of inertia") [kg·m$^2$], $I_2$ is a principal moment of inertia about a second principal axis (hereinafter referred to as "the second principal moment of inertia") [kg·m$^2$], $I_3$ is a principal moment of inertia about a third principal axis (hereinafter referred to as "the third principal moment of inertia") [kg·m$^2$], $\theta_1$ is a component of the attitude angle about the first principal axis (hereinafter referred to as "the first component of attitude angle") [rad], $\theta_2$ is a component of the attitude angle about the second principal axis (hereinafter referred to as "the second component of attitude angle") [rad], $\theta_3$ is a component of the attitude angle about the third principal axis (hereinafter referred to as "the third component of attitude angle") [rad], $T_{c1}$ is a component of the control torque about the first principal axis (hereinafter referred to as "the first component of control torque") [N·m], $T_{c2}$ is a component of the control torque about the second principal axis (hereinafter referred to as "the second component of control torque") [N·m], $T_{c3}$ is a component of the control torque about the third principal axis (hereinafter referred to as "the third component of control torque") [N·m], $T_{d1}$ is a component of the disturbance torque about the first principal axis (hereinafter referred to as "the first component of disturbance torque") [N·m], $T_{d2}$ is a component of the disturbance torque about the second principal axis (hereinafter referred to as "the second component of disturbance torque") [N·m], $T_{d3}$ is a component of the disturbance torque about the third principal axis (hereinafter referred to as "the third component of disturbance torque") [N·m].

Equations of motion in (1) through (3) are rewritten in a matrix form as (4).

$$Wx = T_c + T_d \qquad (4)$$

$$W = \begin{bmatrix} \ddot{\theta}_1 & -\dot{\theta}_2 \dot{\theta}_3 & \dot{\theta}_2 \dot{\theta}_3 \\ \dot{\theta}_3 \dot{\theta}_1 & \ddot{\theta}_2 & -\dot{\theta}_3 \dot{\theta}_1 \\ -\dot{\theta}_1 \dot{\theta}_2 & \dot{\theta}_1 \dot{\theta}_2 & \ddot{\theta}_3 \end{bmatrix},$$

$$x = \begin{bmatrix} I_1 \\ I_2 \\ I_3 \end{bmatrix}, T_c = \begin{bmatrix} T_{c1} \\ T_{c2} \\ T_{c3} \end{bmatrix}, T_d = \begin{bmatrix} T_{d1} \\ T_{d2} \\ T_{d3} \end{bmatrix}$$

where W is a matrix comprising first order and second order time derivatives of attitude angles (hereinafter referred to as "a state matrix") [s$^{-2}$], x is a moment of inertia vector [kg·m$^2$], $T_c$ is the control torque [N·m], $T_d$ is the disturbance torque [N·m].

When the space station is exposed to solar wind and starts vibrating, the control torque calculation unit 135 sends a control input to the plurality of thrusters 140 to generate a control torque given by (5).

$$T_c = \begin{bmatrix} -c_1\dot{\theta}_1 \\ -c_2\dot{\theta}_2 \\ -c_3\dot{\theta}_3 \end{bmatrix}, c_1 > 0, c_2 > 0, c_3 > 0 \tag{5}$$

where $c_1$ is a first speed control parameter that increases damping of the first component of attitude angle [N·m·s/rad], $c_2$ is a second speed control parameter that increases damping of the second component of attitude angle [N·m·s/rad], $c_3$ is a third speed control parameter that increases damping of the third component of attitude angle [N·m·s/rad]. With the control torque in (5), a transient response of the attitude angle dies out. Once the transient response vanishes, the attitude angle contains frequencies comprising the disturbance torque $T_d$ (hereinafter referred to as "a plurality of disturbance frequencies"). The identification frequency selecting device 131 finds the plurality of disturbance frequencies by applying a frequency analysis method to the attitude angle. Examples of the frequency analysis method include but are not limited to fast Fourier transform. Then, the identification frequency selecting device 131 selects an identification frequency $\omega_{ID}$ sufficiently away from the plurality of disturbance frequencies, such that the accuracy of the moment of inertia identification in what follows is not affected by the disturbance torque $T_d$ in (4). It must be noted that the identification frequency is a frequency at which the subsequent calculation of the moment of inertia is conducted. The control torque calculation unit 135 generates a control input to the plurality of thrusters 140 by adding a sinusoidal term having the identification frequency as in (6).

$$T_c = \begin{bmatrix} -c_1\dot{\theta}_1 \\ -c_2\dot{\theta}_2 \\ -c_3\dot{\theta}_3 \end{bmatrix} + \begin{bmatrix} \delta T_{ID1} \\ \delta T_{ID2} \\ \delta T_{ID3} \end{bmatrix} \cos(\omega_{ID}t), c_1 > 0, c_2 > 0, c_3 > 0 \tag{6}$$

where $\delta T_{ID1}$ is amplitude of a first component of an identification torque (hereinafter referred to as "first identification torque amplitude"), $\delta T_{ID2}$ is amplitude of a second component of an identification torque (hereinafter referred to as "second identification torque amplitude"), $\delta T_{ID3}$ is amplitude of a third component of an identification torque (hereinafter referred to as "third identification torque amplitude"). A second term of (6) will be hereinafter referred to as "an identification torque vector".

Moment of inertia identification operator calculation unit calculates a moment of inertia identification operator in (7).

$$W_{ID} = \begin{bmatrix} \ddot{\theta}_{1ID} & -\dot{\theta}_{2ID}\dot{\theta}_{3ID} & \dot{\theta}_{2ID}\dot{\theta}_{3ID} \\ \dot{\theta}_{3ID}\dot{\theta}_{1ID} & \ddot{\theta}_{2ID} & -\dot{\theta}_{3ID}\dot{\theta}_{1ID} \\ -\dot{\theta}_{1ID}\dot{\theta}_{2ID} & \dot{\theta}_{1ID}\dot{\theta}_{2ID} & \ddot{\theta}_{3ID} \end{bmatrix} \tag{7}$$

where $W_{ID}$ is the moment of inertia identification operator [$s^{-2}$], $\theta_{1ID}$ is a frequency component of the first component of attitude angle at the identification frequency (hereinafter referred to as "a first identification frequency component of attitude angle") [rad], $\theta_{2ID}$ is a frequency component of the second component of attitude angle at the identification frequency (hereinafter referred to as "a second identification frequency component of attitude angle") [rad], $\theta_{3ID}$ is a frequency component of the third component of attitude angle at the identification frequency (hereinafter referred to as "a third identification frequency component of attitude angle") [rad]. The first identification frequency component of attitude angle, the second identification frequency component of attitude angle and the third identification frequency component of attitude angle can be obtained by applying a band pass filter in (8) to the first component of attitude angle, the second component of attitude angle and the third component of attitude angle, respectively.

$$G_{BPF}(s) = \frac{1}{r}\frac{s^2 + 2r\zeta\omega_{ID}s + \omega_{ID}^2}{s^2 + 2\zeta\omega_{ID}s + \omega_{ID}^2}, r > 1 \tag{8}$$

where r is a depth of the band pass filter, $\zeta$ is a width of the band pass filter and s is Laplace variable. Thus, the moment of inertia identification operator $W_{ID}$ in (7) approximates a frequency component at the identification frequency of the state matrix W in (4).

A frequency component of the control torque at the identification frequency (hereinafter referred to as "an identification frequency component of control torque") $T_{cID}$ [N·m] can be obtained by applying the band pass filter in (8) to the control torque $T_c$. The identification frequency component of control torque $T_{cID}$ thus obtained becomes the identification torque vector, that is the second term of (6). A part of dynamics of the space station influenced by the identification frequency component of control torque can be expressed as (9).

$$W_{ID}x = T_{cID} \tag{9}$$

The moment of inertia identification device obtains the moment of inertia vector x from (9) as (10).

$$\hat{x} = W_{ID}^{-1}T_{cID} \tag{10}$$

where $\hat{x}$ is an identified moment of inertia vector [kg·m²]. The moment of inertia identification device 133 calculates the identified moment of inertia vector $\hat{x}$ using (10) if the moment of inertia identification operator $W_{ID}$ is not close to singular, otherwise holds a previously calculated value.

The disturbance torque identification device 134 calculates an identified disturbance torque $\hat{T}_d$ using (11) derived from (4) and (10).

$$\hat{T}_d = W\hat{x} - T_c \tag{11}$$

The control torque calculation unit 135 calculates a control signal that causes the plurality of thrusters 140 to generate the control torque in (12).

$$T_c = \begin{bmatrix} -c_1\dot{\theta}_1 \\ -c_2\dot{\theta}_2 \\ -c_3\dot{\theta}_3 \end{bmatrix} + \begin{bmatrix} \delta T_{ID1} \\ \delta T_{ID2} \\ \delta T_{ID3} \end{bmatrix} \cos(\omega_{ID}t) + \begin{bmatrix} (\hat{I}_3 - \hat{I}_2)\dot{\theta}_2\dot{\theta}_3 - k_1\theta_1 \\ (\hat{I}_1 - \hat{I}_3)\dot{\theta}_3\dot{\theta}_1 - k_2\theta_2 \\ (\hat{I}_2 - \hat{I}_1)\dot{\theta}_1\dot{\theta}_2 - k_3\theta_3 \end{bmatrix} - \hat{T}_d, \tag{12}$$

$$c_1 > 0, c_2 > 0, c_3 > 0$$

where $\hat{I}_1$ is a first component of the identified moment of inertia vector (hereinafter referred to as "a first identified moment of inertia") [kg·m²], $\hat{I}_2$ is a second component of the identified moment of inertia vector (hereinafter referred to as "a second identified moment of inertia") [kg·m²], $\hat{I}_3$ is a third component of the identified moment of inertia vector (hereinafter referred to as "a third identified moment of inertia") [kg·m²], $k_1$ is a first position control parameter that is used to control the first component of attitude angle [N·m/rad], $k_2$ is a second position control parameter that is used to control the second component of attitude angle [N·m/rad], $k_3$ is a third position control parameter that is used to control the third component of attitude angle [N·m/rad]. With the control torque in (12), the attitude angle converges to zero as the identification torque vector that is a second term in (12) is reduced to zero.

The identification torque vector is gradually reduced to zero as the aforementioned moment of inertia identification by (10) is completed, and remains zero while the vibration of space station due to the disturbance torque is suppressed using the control torque in (12). If astronaut motion, manipulation of payloads or docking with other spacecraft causes the moment of inertia vector x to deviate from the identified moment of inertia vector $\hat{x}$ to the extent that the control torque vector in (12) can no longer suppress the vibration of space station, the aforementioned procedure is repeated and the control signal for the plurality of thrusters 140 to generate the control torque in (12) is recalculated by the attitude control device 130.

Figure 2:
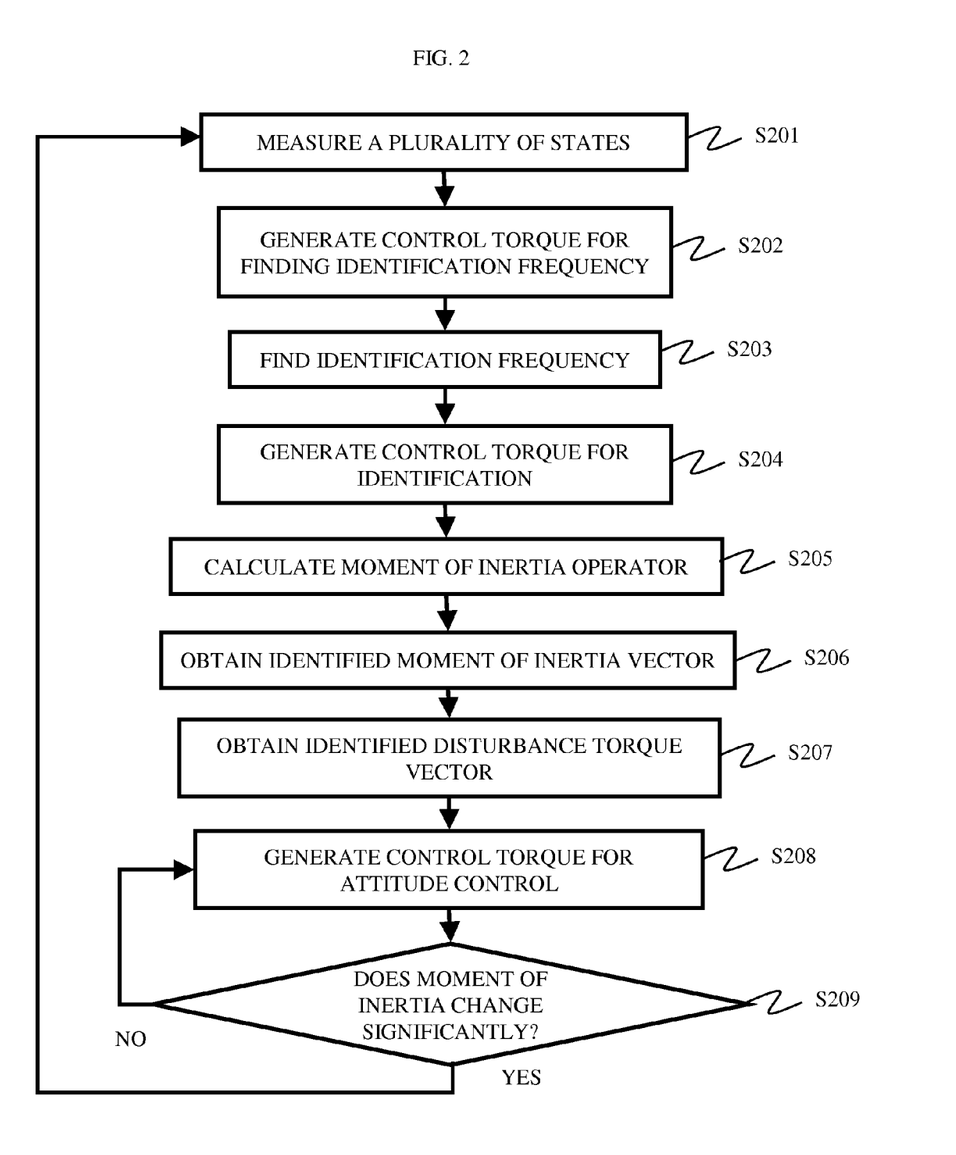
FIG. 2 is a flowchart showing a processing flow of the attitude control device for space station in accordance with an exemplary embodiment of the invention.

Next a processing flow of the attitude control device for space station is described using FIG. 2. FIG. 2 is a flowchart showing a processing flow of the attitude control device for space station in accordance with an exemplary embodiment of the invention. The plurality of state sensors 120 measure the states of the space station such as the three attitude angles about the three principal axes and time derivatives thereof, and send them to the identification frequency selecting device 131 (S201).

The control torque calculation unit 135 generates the control signal causing the plurality of thrusters to generate the control torque given by (5) for finding the identification frequency, and sends it to the identification frequency selecting device 131 (S202).

The identification frequency selecting device 131 calculates the plurality of disturbance frequencies using a frequency analysis method such as Fourier transform, and selects an identification frequency $\omega_{ID}$ sufficiently away from the plurality of disturbance frequencies (S203).

The control torque calculation unit 135 calculates the control signal that causes the plurality of thrusters 140 to generate the control torque in (6) (S204).

The moment of inertia identification operator calculation unit 132 calculates the moment of inertia identification operator in (7) using the first frequency component of attitude angle, the second frequency component of attitude angle and the third frequency component of attitude angle, and sends the moment of inertia identification operator to the moment of inertia identification device 133 (S205).

The moment of inertia identification device 133 calculates the identified moment of inertia vector $\hat{x}$ using (10), and sends the identified moment of inertia vector to the disturbance torque identification device 134 and the control torque calculation unit 135 (S206).

The disturbance torque identification device 134 calculates the identified disturbance torque vector $\hat{T}_d$ using (11), and sends the identified disturbance torque to the control torque calculation unit 135 (S207).

The control torque calculation unit 135 calculates the control signal that causes the plurality of thrusters 140 to generate the control torque in (12), and sends the control signal to the plurality of thrusters 140 (S208).

The control torque calculation unit 135 generates the control signal such that the second term in (12) is reduced to zero. Then, the attitude angle converges to zero. If astronaut movements, transfer of payloads and reaction force from a docking spacecraft are sufficiently small such that the attitude angle stays at zero, the control torque calculation unit 135 continues to generate the same control signal (NO of S209). Otherwise, steps S201 through S208 are repeated (YES of S209).

Hereinafter, simulation results of aforementioned control processes of the attitude control device for space station in accordance with an exemplary embodiment of the invention are described in detail. The simulation assumes a space station docking with other spacecraft such that the first principal moment of inertia $I_1$, the second principal moment of inertia $I_2$ and the third principal moment of inertia $I_3$ increase as in FIG. 3 through FIG. 5, and exposed to a solar wind causing a disturbance torque with components of amplitude $1.0 \times 10^9$ [N·m] and frequency $1.0(2\pi)$[rad/s].

Figure 3:
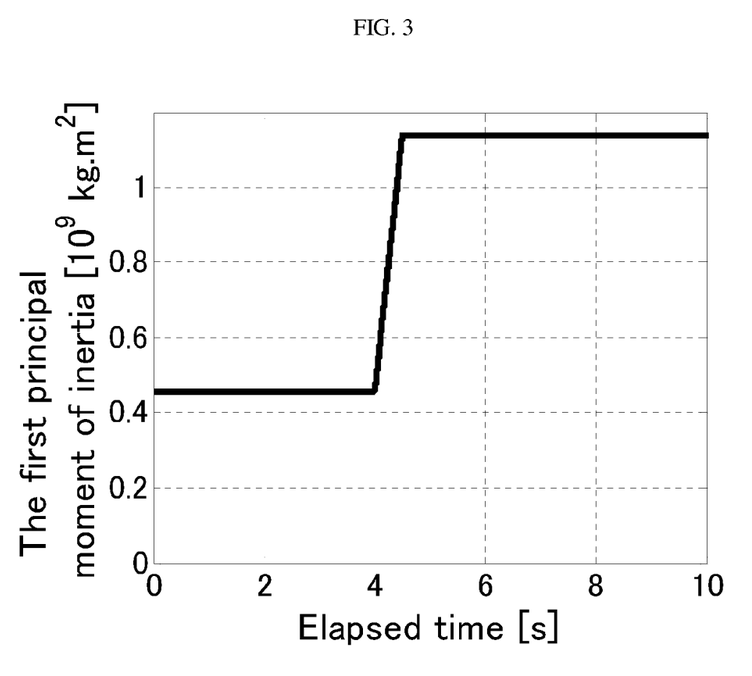
FIG. 3 is a simulation result of an exemplary embodiment of the invention showing a first principal moment of inertia.

FIG. 3 is a simulation result of an exemplary embodiment of the invention showing the first principal moment of inertia. As in the figure the first principal moment of inertia is increased from $0.46 \times 10^9$ [kg·m$^2$] to $1.14 \times 10^9$ [kg·m$^2$] due to docking with other spacecraft after 4 [s].

Figure 4:
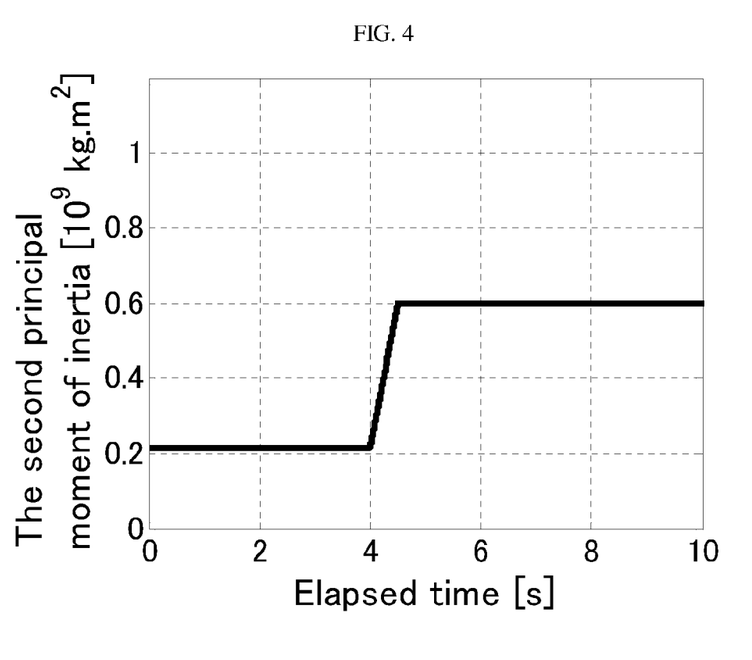
FIG. 4 is a simulation result of an exemplary embodiment of the invention showing a second principal moment of inertia.

FIG. 4 is a simulation result of an exemplary embodiment of the invention showing the second principal moment of inertia. As in the figure the second principal moment of inertia is increased from $0.21 \times 10^9$ [kg·m$^2$] to $0.60 \times 10^9$ [kg·m$^2$] due to docking with other spacecraft after 4 [s].

Figure 5:
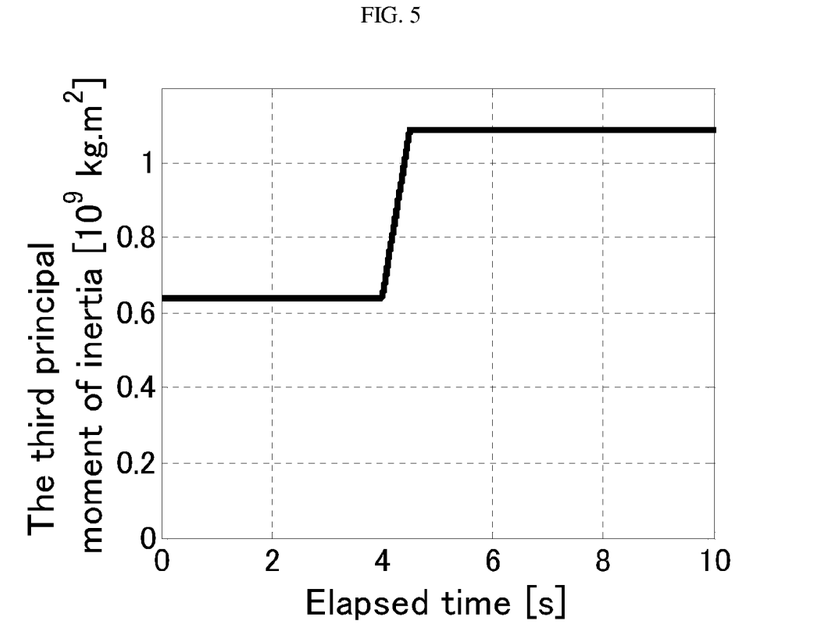
FIG. 5 is a simulation result of an exemplary embodiment of the invention showing a third principal moment of inertia.

FIG. 5 is a simulation result of an exemplary embodiment of the invention showing the third principal moment of inertia. As in the figure the third principal moment of inertia is increased from $0.64 \times 10^9$ [kg·m$^2$] to $1.09 \times 10^9$ [kg·m$^2$] due to docking with other spacecraft after 4 [s].

Figure 6:
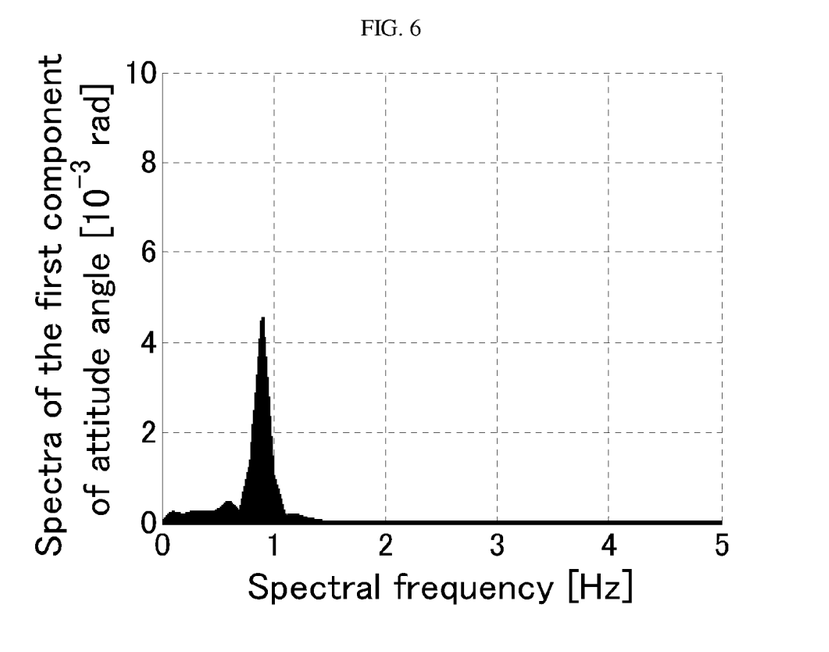
FIG. 6 is a simulation result of an exemplary embodiment of the invention showing spectra of a first component of attitude angle.
Figure 7:
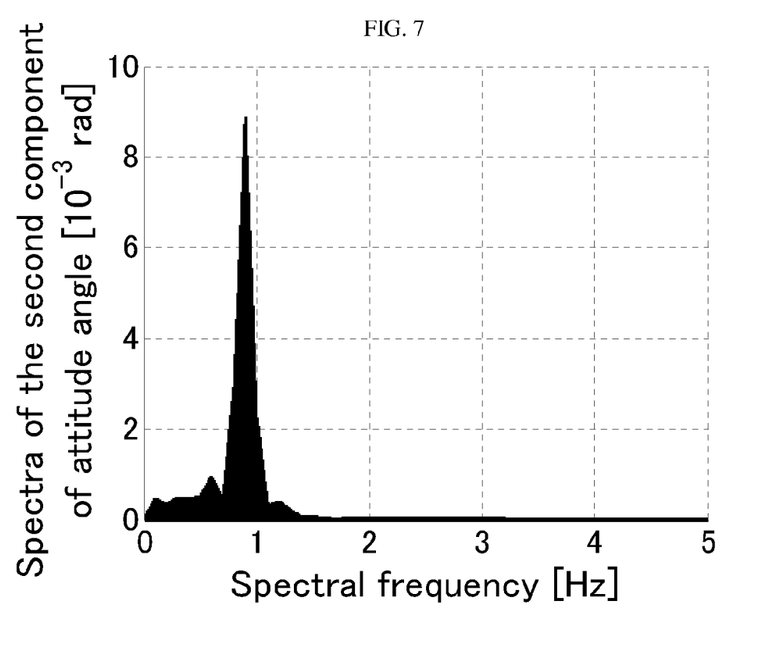
FIG. 7 is a simulation result of an exemplary embodiment of the invention showing spectra of a second component of attitude angle.
Figure 8:
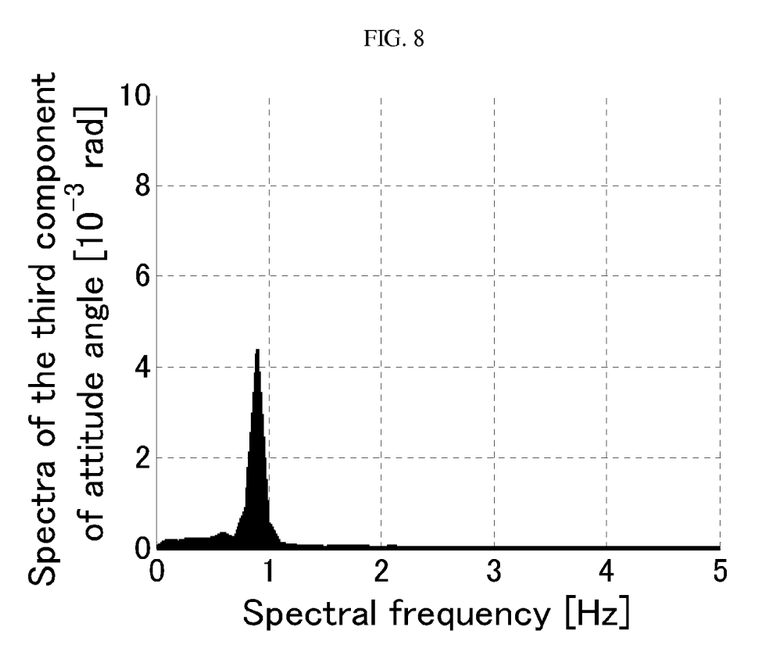
FIG. 8 is a simulation result of an exemplary embodiment of the invention showing spectra of a third component of attitude angle.

FIG. 6 is a simulation result of an exemplary embodiment of the invention showing spectra of the first component of attitude angle, FIG. 7 is a simulation result of an exemplary embodiment of the invention showing spectra of the second component of attitude angle, and FIG. 8 is a simulation result of an exemplary embodiment of the invention showing spectra of the third component of attitude angle. FIG. 6 through FIG. 8 are obtained by the identification frequency selecting device 131 applying Fourier transform to the first component of attitude angle, the second component of attitude angle and the third component of attitude angle, respectively. Based on FIG. 6 through FIG. 8, the identification frequency selecting device 131 estimates disturbance frequency as $0.9(2\pi)$ [rad/s]. Estimated disturbance frequency is slightly smaller than frequency of actual disturbance torque because of damping introduced by (5). Then, the identification frequency selecting device 131 selects the identification frequency as $5.0(2\pi)$ [rad/s] which is sufficiently away from the disturbance frequency.

Figure 9:
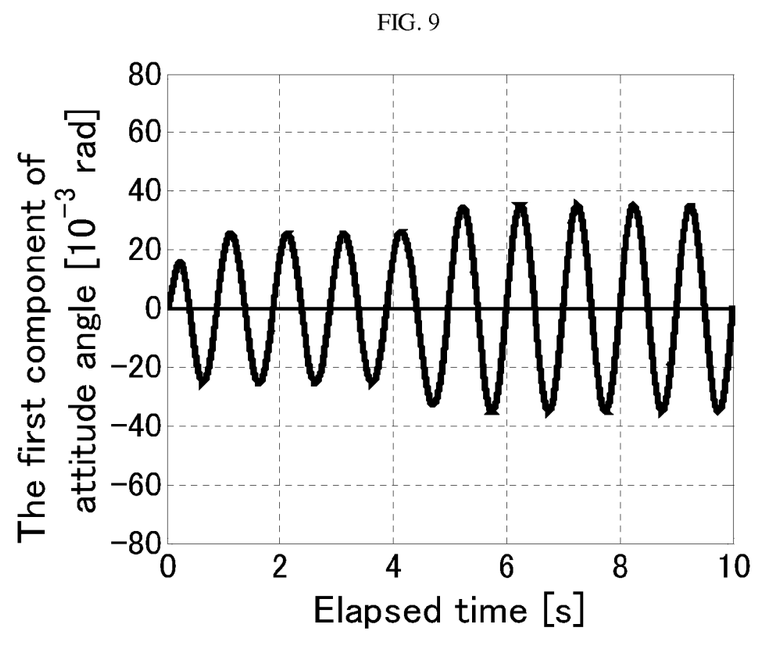
FIG. 9 is a simulation result of an exemplary embodiment of the invention showing the first component of attitude angle with attitude control due to prior art.
Figure 10:
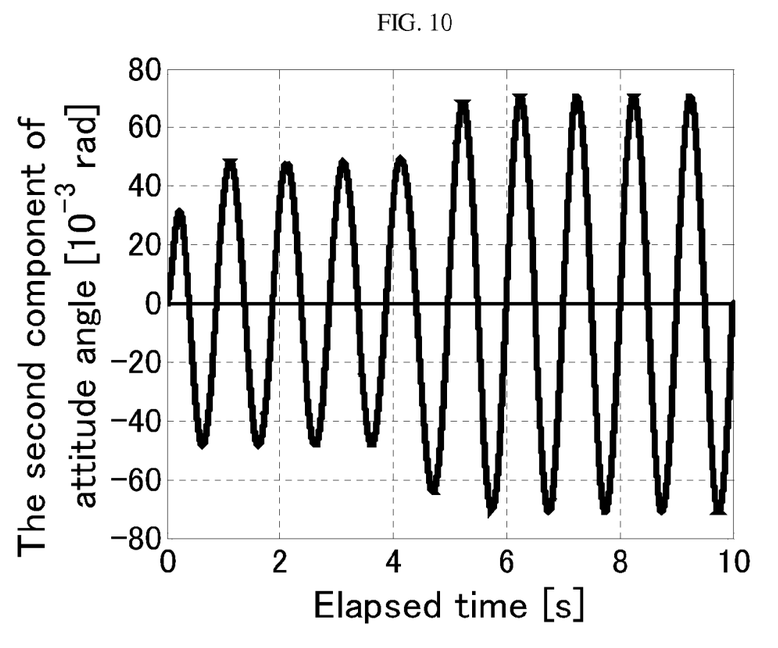
FIG. 10 is a simulation result of an exemplary embodiment of the invention showing the second component of attitude angle with attitude control due to the prior art.
Figure 11:
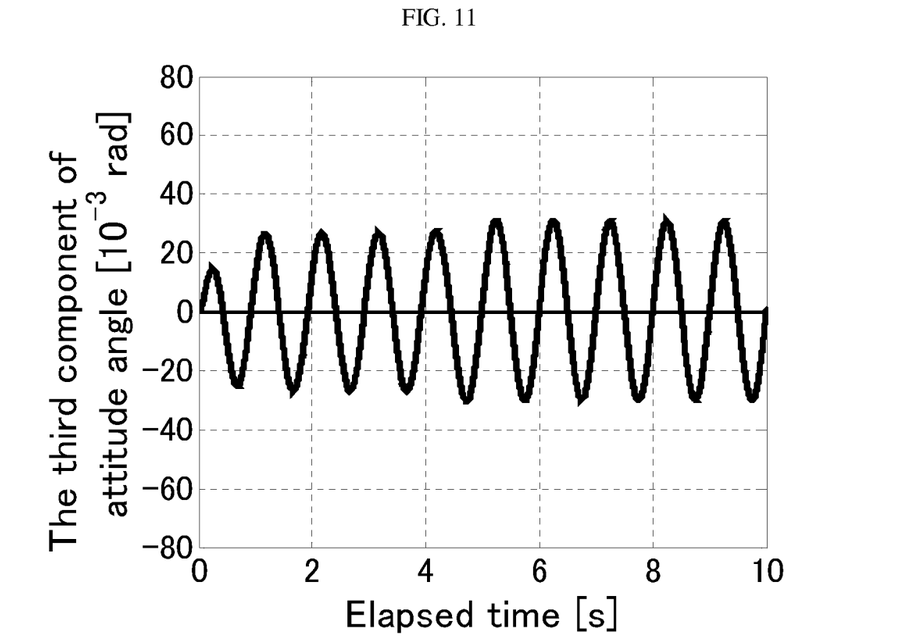
FIG. 11 is a simulation result of an exemplary embodiment of the invention showing the third component of attitude angle with attitude control due to the prior art.

FIG. 9 is a simulation result of an exemplary embodiment of the invention showing the first component of attitude angle with attitude control due to prior art, FIG. 10 is a simulation result of an exemplary embodiment of the invention showing the second component of attitude angle with attitude control due to the prior art, and FIG. 11 is a simulation result of an exemplary embodiment of the invention showing the third component of attitude angle with attitude control due to the prior art. As an example of the prior art, the simulation in FIG. 9 through FIG. 11 adopted adaptive robust control. The simulation assumes that sampling time is $1.0 \times 10^{-3}$ [s]. FIG. 9 through FIG. 11 show the three components of attitude angle grow as the first principal moment of inertia, the second principal moment of inertia and the third principal moment of inertia increase faster than adaptation of system parameters by the prior art, and the control bandwidth of adaptive robust control is decreased temporarily. The maximum amplitude of vibration of the first component of attitude angle, that of the second component of attitude angle and that of the third component of attitude angle are $35.2 \times 10^{-3}$ [rad], $71.2 \times 10^{-3}$ [rad] and $31.1 \times 10^{-3}$ [rad], respectively.

Figure 12:
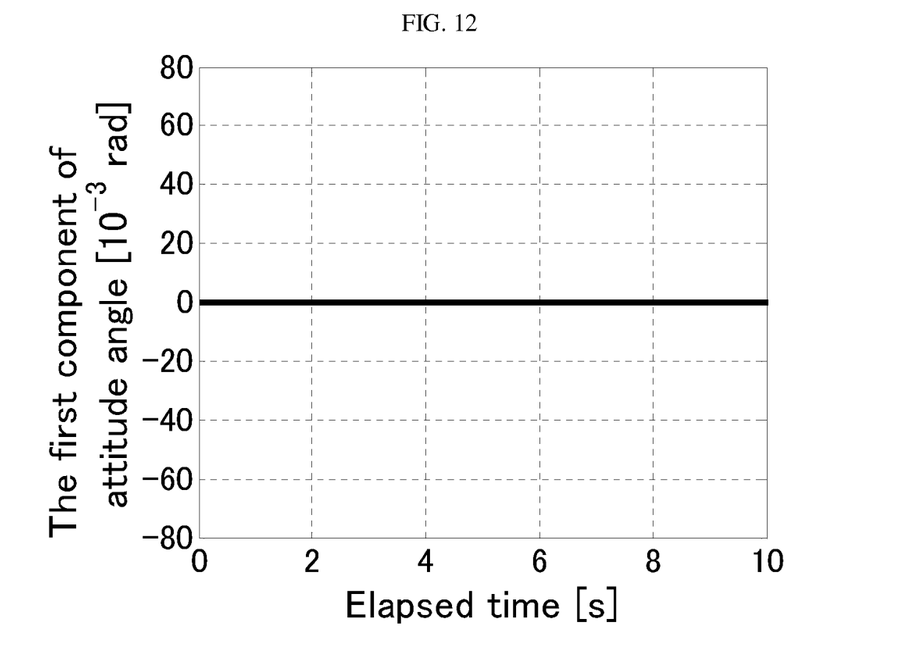
FIG. 12 is a simulation result of an exemplary embodiment of the invention showing the first component of attitude angle with attitude control due to the present invention.
Figure 13:
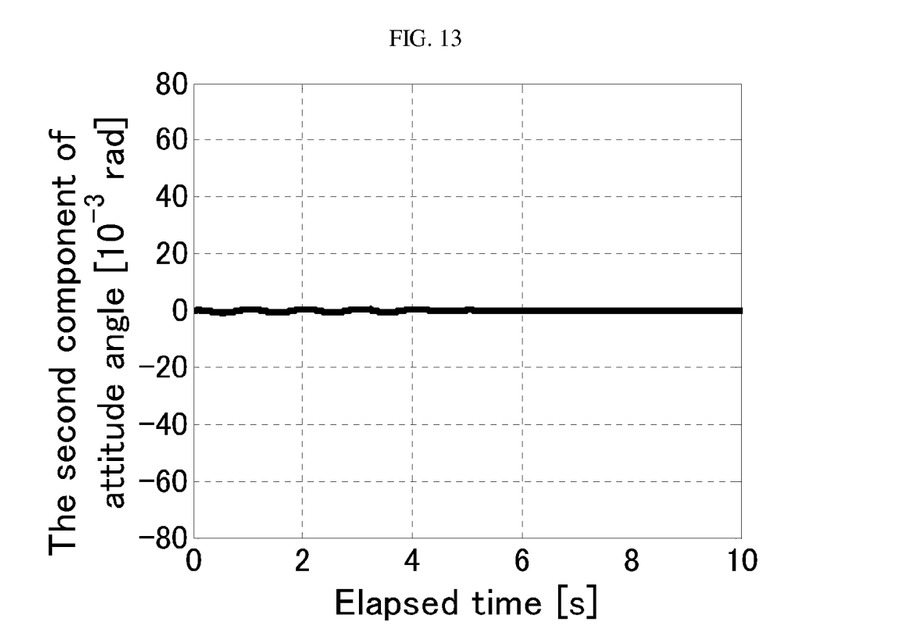
FIG. 13 is a simulation result of an exemplary embodiment of the invention showing the second component of attitude angle with attitude control due to the present invention.
Figure 14:
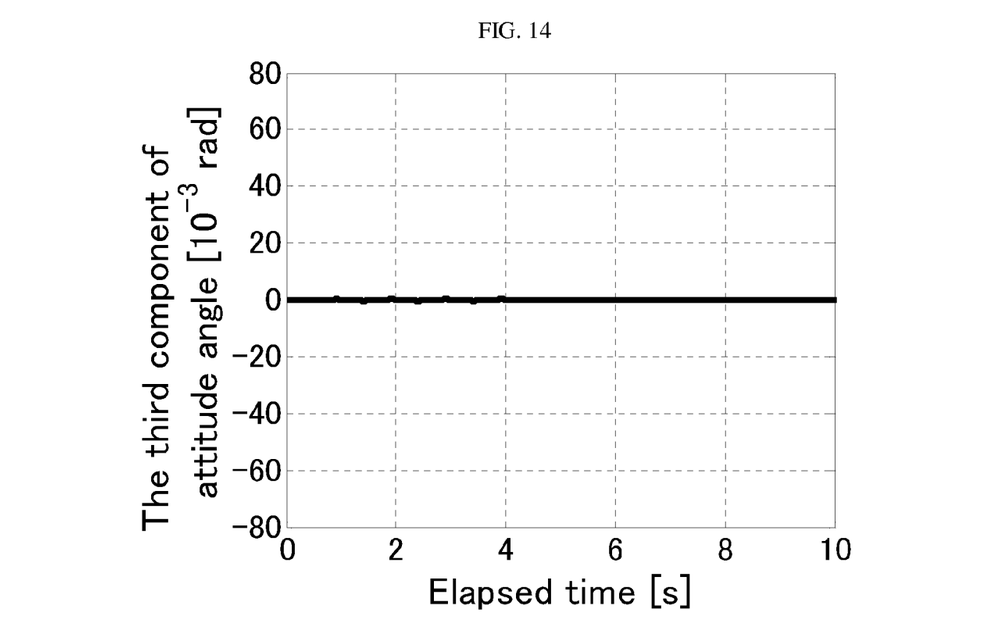
FIG. 14 is a simulation result of an exemplary embodiment of the invention showing the third component of attitude angle with attitude control due to the present invention.

FIG. 12 is a simulation result of an exemplary embodiment of the invention showing the first component of attitude angle with attitude control due to the present invention, FIG. 13 is a simulation result of an exemplary embodiment of the invention showing the second component of attitude angle with attitude control due to the present invention, and FIG. 14 is a simulation result of an exemplary embodiment of the invention showing the third component of attitude angle with attitude control due to the present invention. The simulation assumes that sampling time is $1.0 \times 10^{-3}$ [s]. FIG. 12 through FIG. 14 show no growth of vibration as the first principal moment of inertia, the second principal moment of inertia and the third principal moment of inertia increase rapidly from their initial values, since moment of inertia identification and disturbance torque identification can be completed within one sampling period which is faster than the prior art. The maximum amplitude of vibration of the first component of attitude angle, that of the second component of attitude angle and that of the third component of attitude angle are $0.24 \times 10^{-3}$ [rad], $0.75 \times 10^{-3}$ [rad] and $0.25 \times 10^{-3}$ [rad], respectively. Thus, the present invention reduced the maximum amplitude of vibration of the first component of attitude angle, that of the second component of attitude angle, and that of the third component of attitude angle by 145 times, 95 times, and 123 times, respectively.

Although the above simulation assumes a space station represented by a lumped parameter system, the present invention can be applied, with a minor modification apparent to those skilled in the art, to a variety of space stations, all or a part of which is represented by a distributed parameter system.

The attitude control device for space station in the foregoing embodiment can be realized as an electrical/electronic/programmable electronic system. Examples of the electrical/electronic/programmable electronic system include but are not limited to a control system comprising an application specific integrated circuit (ASIC) and a microcontroller.

While, in the foregoing embodiment, the disturbance torque containing a single frequency component is considered, the present invention can be applied regardless of the number of frequency components comprising the disturbance torque.

The described embodiments of the current invention are only exemplary and numerous variations thereof apparent to those skilled in the art are intended to be within the scope of the current invention as defined in the following claims.

The invention claimed is:

1. An attitude control device for space station comprising a space station structure including habitable area, a plurality of solar arrays, a plurality of propellant tanks, a plurality of propulsion systems, a plurality of docking ports; a plurality of state sensors for measuring three attitude angles about three principal axes and time derivatives thereof; and a plurality of thrusters for generating control torque and for stabilizing the three attitude angles, the attitude control device comprising:
   an identification frequency selecting device finding a plurality of frequencies of disturbance torque applying Fourier transform to the three attitude angles measured by the plurality of state sensors while speed proportional control of the space station is conducted, and selecting an identification frequency, that is a pass frequency of a band pass filter generating a frequency component of the control torque and the three attitude angles sufficiently away from a plurality of frequencies dominant in the three attitude angles such that disturbance torque has no influence on the frequency component of the control torque and the three attitude angles generated by the band pass filter, and hence the accuracy of moment of inertia identification;
   a moment of inertia identification operator calculation unit generating a first order time derivative and a second order time derivative of the three attitude angles, generating a frequency component thereof by applying a band pass filter with a pass frequency at the identification frequency, and calculating a moment of inertia identification operator, a three by three matrix with components that are functions of the second order time derivative of a frequency component of the three attitude angles at the identification frequency, and polynomials of the first order time derivative of a frequency component of the three attitude angles at the identification frequency;
   a moment of inertia identification device generating a frequency component of the control torque by applying a band pass filter with a pass frequency at the identification frequency, generating an inverse of the moment of inertia identification operator that consists of the first order and the second order time derivative of the three attitude angles, identifying degree of singularity of the moment of inertia identification operator, calculating the moment of inertia of the space station as the frequency component of control torque at the identification frequency pre-multiplied by the inverse of the moment of inertia identification operator while the moment of inertia identification operator is not close to singular, and holding previously calculated value of the moment of inertia otherwise;
   a disturbance torque identification device calculating disturbance torque due to solar wind as a difference between the moment of inertia of the space station from the moment of inertia identification device pre-multiplied by a three by three matrix with components that are functions of a second order time derivative of the three attitude angles, and polynomials of a first order time derivative of the three attitude angles, and the control torque; and
   a control torque calculation unit identifying the end of transient response of the three attitude angles, calculating, after the end of the transient response is identified, a control signal that causes a plurality of thrusters to generate the control torque stabilizing the space station as a linear combination of a three dimensional vector with components proportional to a time derivative of the three attitude angles, a three dimensional vector with components proportional to a sinusoidal function oscillating at the identification frequency that is a sinusoidal component superimposed to the control torque wherein amplitude thereof is gradually reduced to zero as the calculation of the moment of inertia by the moment of inertia identification device is completed, a three dimensional vector nonlinear with respect to the time derivative of the three attitude angles, and the disturbance torque from the disturbance torque identification device; continuing to generate the control torque while the three attitude angles stay at zero; initiating recalculation in the identification frequency selecting device, the moment of inertia identification operator, the moment of inertia identification device, and the disturbance torque identification device; and regenerating the control torque based on the aforementioned recalculation otherwise.

* * * * *